(12) United States Patent
Chang

(10) Patent No.: US 6,266,786 B1
(45) Date of Patent: Jul. 24, 2001

(54) METHOD AND CIRCUIT FOR SAFEGUARDING CMOS RAM DATA IN A COMPUTER SYSTEM AT LOW BATTERY POWER

(75) Inventor: Nai-Shung Chang, Yung-Ho (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/199,845

(22) Filed: Nov. 25, 1998

(30) Foreign Application Priority Data

Aug. 4, 1998 (TW) ................................. 87112807

(51) Int. Cl.[7] ............................. G06F 1/26; G06F 11/30
(52) U.S. Cl. ............................. 714/22; 714/24; 713/340
(58) Field of Search .................. 714/14, 22, 24; 713/320, 323, 324, 340, 330

(56) References Cited

U.S. PATENT DOCUMENTS

| | | | |
|---|---|---|---|
| 4,965,738 | * 10/1990 | Bauer et al. | 364/483 |
| 5,315,161 | * 5/1994 | Robinson et al. | 307/66 |
| 5,884,084 | * 3/1999 | Nelson et al. | 713/300 |
| 6,041,413 | * 3/2000 | Wang | 713/202 |

OTHER PUBLICATIONS

Intel Corporation, ATX Specification Version 2.01, pp.1–27, Feb. 1997.*

* cited by examiner

Primary Examiner—Robert Beausoleil
Assistant Examiner—Scott Baderman
(74) Attorney, Agent, or Firm—Jiawei Huang; J. C. Patents

(57) ABSTRACT

A method and circuit is provided for safeguarding the data stored in a CMOS RAM (Complementary Metal-Oxide Semiconductor Random Access Memory) unit in a computer system, such as an IBM-compatible personal computer (PC), when the battery unit used to power the CMOS RAM unit is below working level. By this method and circuit, when the PC is powered off, the current power level of the battery unit is detected to see whether it is below working level; if yes, the main power of the PC is turned on; then the data currently stored in the CMOS RAM unit are moved to a backup-data storage unit such as the hard disk; and after this, the main power is turned off again. At the next time the PC is powered on, the data currently stored in the backup-data storage unit are moved back to the CMOS RAM unit; and after this, a message is displaying on the monitor screen requesting the user to replace the CMOS RAM battery with a new one.

8 Claims, 2 Drawing Sheets

METHOD AND CIRCUIT FOR SAFEGUARDING CMOS RAM DATA IN A COMPUTER SYSTEM AT LOW BATTERY POWER

CROSS-REFERENCE TO RELATED APPLICATION

This application claims the priority benefit of Taiwan application Ser. No. 87112807, filed Aug. 4, 1998, the full disclosure of which is incorporated herein by reference.

BACKGROUND OF THE INVENTION

1. Field of the Invention

This invention relates to computer technology, and more particularly, to a method and circuit for safeguarding the data stored in a CMOS RAM (Complementary Metal-Oxide Semiconductor Random Access Memory) in a computer system, such as an IBM-compatible personal computer (PC), when the battery unit used to power the CMOS RAM is below working level.

2. Description of Related Art

CMOS RAMs are a volatile memory made using CMOS technology, which are characterized in low power consumption and are therefore widely used as the storage means for BIOS (Basic Input Output Systems) setup data and real-time clock in PCs. A CMOS RAM unit in a PC is typically from 128 to 256 bytes in capacity.

In a PC, the CMOS RAM is typically powered alternatively by two sources: a main power supply and a battery unit, in such a manner that when the PC is powered on, the CMOS RAM is powered by the main power supply, and when powered off, the CMOS RAM is powered by the battery unit. The battery unit is typically a nonrechargeable type. For the purpose of environmental protection, the US regulations specifically set forth the use of lithium battery as the battery for CMOS RAM in PCs. When the PC is powered off, the data stored in the CMOS RAM can still be retained since it is still powered by the battery. When the PC is powered on, the power connection to the CMOS RAM will be switched from the battery to the main power supply for the purpose of saving battery power.

FIG. 1 is a schematic diagram showing a typical power supply system for a CMOS RAM unit 100 in a PC. As shown, the CMOS RAM 100 is connected via a first diode D1 to the main supply $V_{CC}$ of the PC, and via a second diode D2 to a battery unit, which is typically a nonrechargeable lithium battery unit supplying a battery power VBAT, where VBAT is less in magnitude than $V_{CC}$. When the PC is powered on, the main power $V_{CC}$ is transferred to the CMOS RAM 100. In this case, since $V_{CC}$ is greater in magnitude than VBAT, the second diode D2 is reversely biased, and thus the battery voltage VBAT is inhibited by the second diode D2. However, when the PC is powered off, the second diode D2 is fowardly biased, thus allowing the battery voltage VBAT to be transferred to the CMOS RAM 100.

One drawback to the foregoing system, however, is that the battery unit is non-rechargeable and therefore will be consumed up over time. When the battery power is below working level, it has to be replaced by a new one. When doing this, the data stored in the CMOS RAM 100 can be permanently lost. Therefore, each time the old battery is replaced, the user has to redo the previous settings to the PC, which is quite inconvenient to the user and may cause some data to be lost forever.

In modern PCs, the CMOS RAM is also used to store some important initialization data of the operating system (OS) in addition to BIOS setup data. Therefore, once the data stored in the CMOS RAM are lost, it would be extremely difficult and laborious to put the PC back to work.

SUMMARY OF THE INVENTION

It is therefore an objective of the present invention to provide a method and circuit for safeguarding CMOS RAM data in a computer system at low battery power so that the CMOS RAM data would not be lost when the system battery is below working level.

In accordance with the foregoing and other objectives of the present invention, a method and circuit for safeguarding CMOS RAM data in a computer system is provided.

By the method of the invention, when the PC is powered off, the current power level of the battery unit is detected to see whether it is below working level; if yes, the main power of the PC is turned on; the data currently stored in the CMOS RAM unit are moved to a backup-data storage unit such as the hard disk; and after this, the main power is turned off again. At the next time the PC is powered on, the data currently stored in the backup-data storage unit are moved back to the CMOS RAM unit; and after this, a message is displaying on the monitor screen, requesting the user to replace the battery unit for the CMOS RAM unit with a new one.

The CMOS RAM data safeguarding circuit of the invention is designed for use on a computer system of the type having a power supply capable of generating a main power and a standby power and a CMOS RAM unit powered by a battery unit when the computer system is powered off and by the main power from the power supply when the computer system is power on. The circuit of the invention includes a battery power detector, which is powered by the standby power from the power supply when the computer system is powered off, for detecting whether the battery power from the battery unit is below working level; if yes, the battery power detector generating a backup request signal. Moreover, the circuit of the invention includes a main control unit, which is powered by the main power from the power supply when the computer system is powered on and by the standby power from the same power supply when the computer system is powered off, capable of, when activated by the backup request signal from the battery power detector, moving the data currently stored in the CMOS RAM unit to a backup-data storage unit, such as the hard disk. Thereafter, at the next time the computer system is powered on, the main control unit moves the backup data from the backup-data storage unit back to the CMOS RAM unit. In this manner, the CMOS RAM data are safeguarded from losing at low battery power.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In earlier models of PCs and workstations, mechanical types of on/off switches are used as power switches to control the supply of electrical power to the computer circuitry. When the power switch is turned on by the user, the electrical power is supplied to the computer circuitry, and when turned off, the electrical power is disconnected. Conventional computer circuitry is typically driven by 5 V to 12 V. The mechanical types of power switches can be switched on or off only through manual means.

The Intel Corporation of Santa Clara, Calif., USA has introduced a new architecture for computer motherboard, called ATX, in which the main power supply for the PC can be controlled through software means instead of manual means. This software type of control allows the PC to control the on/off of the main power supply in more versatile ways.

In accordance with the ATX 2.01 specification, a 5 V standby power (SBP) with a low 0.7 A output current is provided. When the PC is powered off, the standby power is still on to power the basic power management circuitry in the PC that can be preset to perform some functions when the user is absent. For instance, the PC can be present in such a manner as to automatically transmit fax messages at night when the telephone fee is downrated, or received dial-in messages during holidays when no users are nearby.

A computer motherboard based on the ATX architecture can therefore utilize the standby power to keep a minimal amount of hardware under operating state when the PC is powered off. The invention utilizes the feature to perform the function of safeguarding the CMOS RAM data when the battery for the CMOS RAM is below working level.

Figure 2:
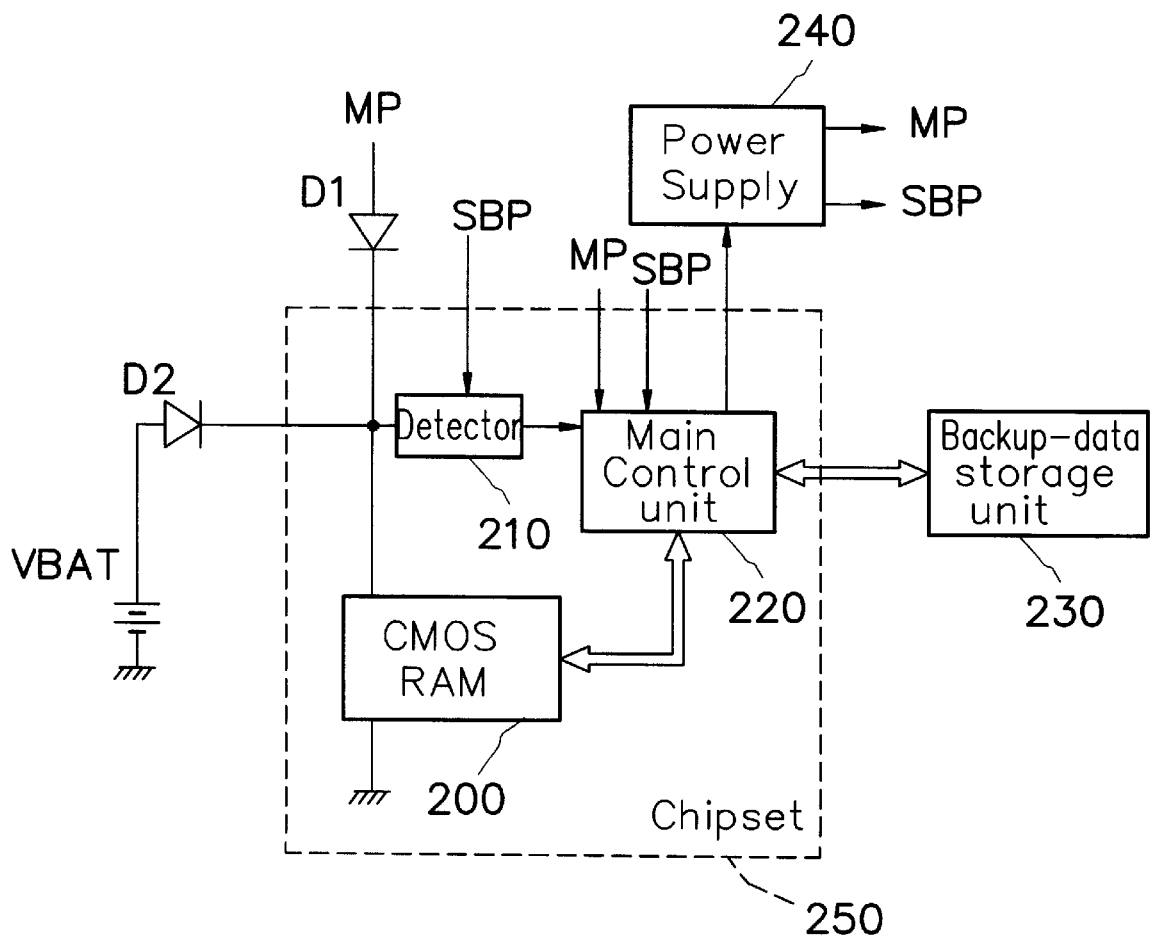
FIG. 2 is a schematic block diagram of the CMOS RAM data safeguarding circuit of invention.

FIG. 2 is a schematic block diagram of the CMOS RAM data safeguarding circuit of invention. As shown, the CMOS RAM data safeguarding circuit of the invention is used to safeguard the data stored in a CMOS RAM unit 200. The CMOS RAM data safeguarding circuit of the invention can be integrated together with the CMOS RAM unit 200 in a chipset, as the part enclosed in a dashed box indicated by the reference numeral 250. The chipset 250 further includes a battery power detector 210 and a main control unit 220. The chipset 250 is coupled to a power supply 240 which is of the type capable of generating a main power MP and a standby power SBP and is capable of being on/off controlled through software. The power supply 240 operates in such a manner that when the PC is powered on, the power supply 240 outputs the main power MP; and whereas when the PC is powered off, the power supply 240 outputs the standby power SBP.

The chipset 250 is further coupled via a first diode D1 to the main power MP generated by the power supply 240 and a via a second diode D2 to a battery unit supplying a battery power VBAT.

Figure 1:
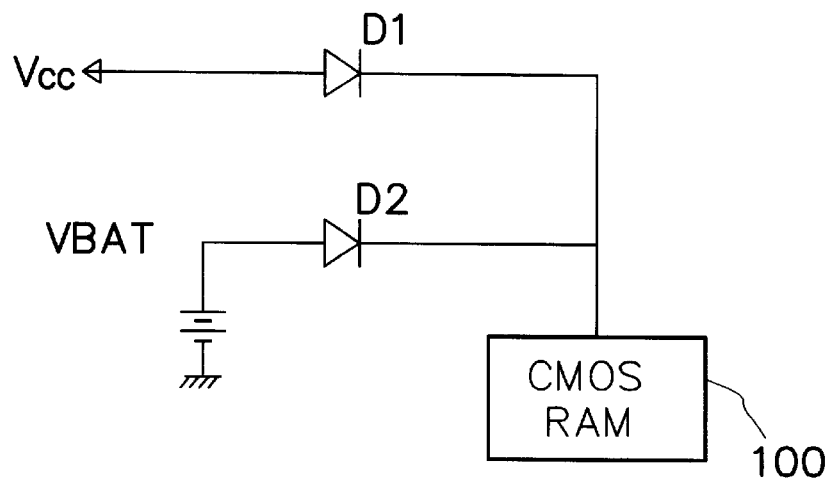
FIG. 1 is a schematic diagram showing a conventional power supply system for a CMOS RAM.

The CMOS RAM unit 200 is used to store the BIOS and OS data of the PC. When the PC is powered on, the CMOS RAM unit 200 takes on the main power MP; and when the PC is powered off, the CMOS RAM unit 200 takes on the battery power VBAT in the same manner as described in reference to FIG. 1, so description thereof will not be further repeated.

When the PC is powered off, the standby power SBP is transferred to the battery power detector 210, whereby the battery power detector 210 is activated to detect whether the battery power VBAT is lower than the rated working level. If yes, the battery power detector 210 will output a backup request signal to the main control unit 220.

The main control unit 220 is powered by the main power MP when the PC is powered on, and by the standby power SBP when the PC is powered off. Therefore, the main control unit 220 is always in working state no matter the PC is powered on or off. In response to the backup request signal from the battery power detector 210, which indicates that the battery power VBAT is currently below the working level, the main control unit 220 will generate a power-on signal to the power supply 240 so as to command the power supply 240 to output the main power MP, thus powering on the PC. When the PC is powered on, the main control unit 220 operates in such a manner as to move all the data currently stored in the CMOS RAM unit 200 to the backup-data storage unit 230. The backup-data storage unit 230 should be of the type that can retain data permanently, such as a hard disk. After the data transfer is completed, the main control unit 220 then switch the power supply 240 to output the standby power SBP, and the PC is powered off.

Thereafter, at the next time when the PC is powered on, the main control unit 220 will be promptly activated to move the data currently stored in the backup-data storage unit 230 back to the CMOS RAM unit 200 before the booting of the PC. After this, the PC will display a message on the monitor screen, requesting the user to replace the battery.

Therefore, the computer motherboard system of the invention can safeguard the CMOS RAM data by performing backup for the data stored in the CMOS RAM at low battery power, and thereafter restore the backup data to the CMOS RAM at the next time the PC is powered on. This can prevent the CMOS RAM data from being lost when the battery power is below the working level.

The battery power detector 210 can be additionally provided with the function of detecting the expiration date of the CMOS RAM battery. If over the expiration date, the battery power detector 210 will also output the backup request signal to the main control unit 220 to perform the same backup operation to the data stored in the CMOS RAM unit 200.

The foregoing is a hardware implementation of the invention. In addition, the invention can be realized through software method. The procedural steps involved in the method of the invention to safeguard the CMOS RAM data at low battery power are given in the flow diagram of FIG. 3.

Figure 3:
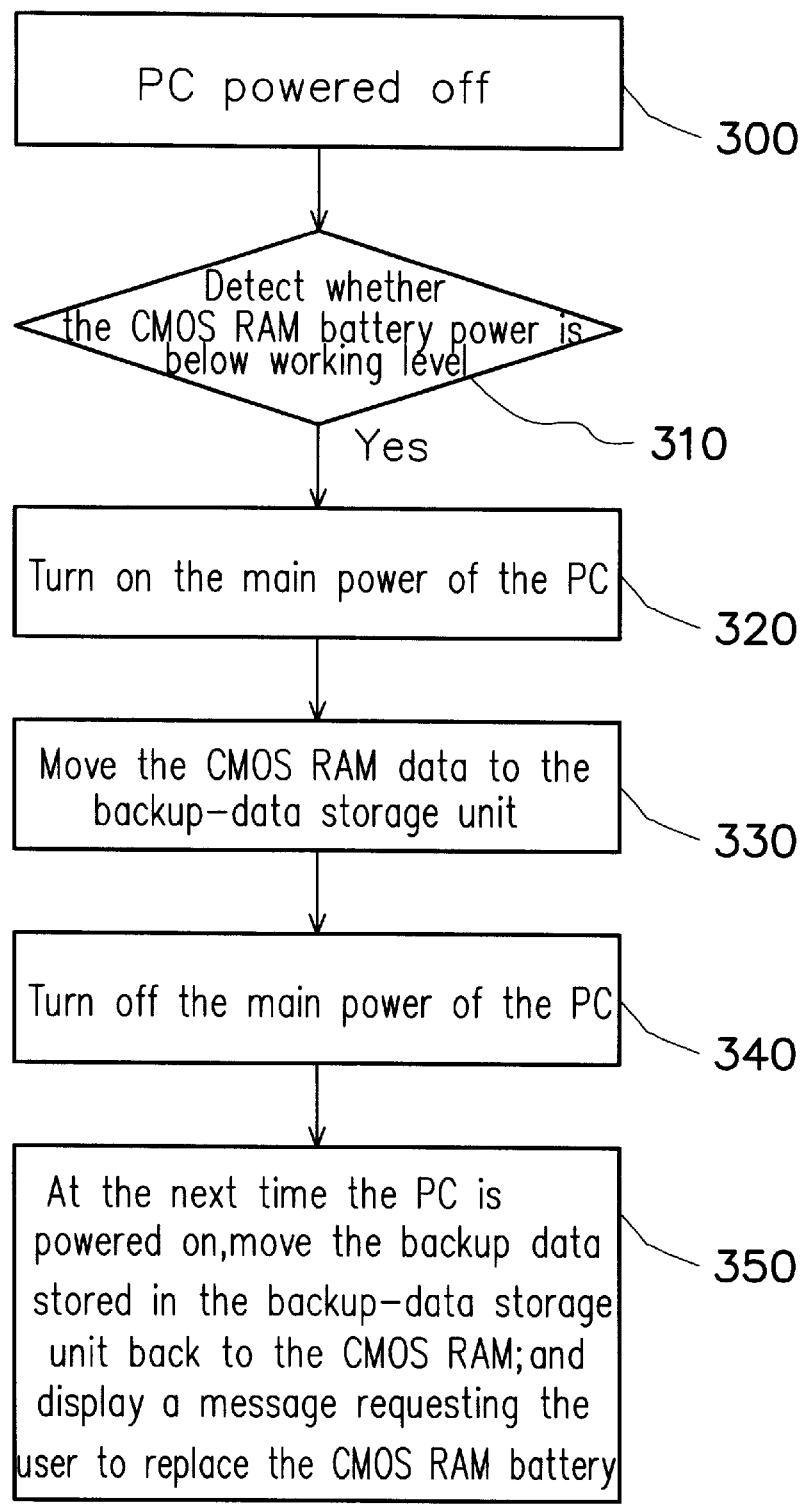
FIG. 3 is a flow diagram showing the procedural steps involved in the method of the invention for safeguarding CMOS RAM data at low battery power.

As shown in FIG. 3, in the initial step 300, the PC is powered off. In the power-off state, the procedure goes to the step 310, in which the PC detects whether the CMOS RAM battery power is below the working level. If yes, the procedure goes to step 320.

In the step 320, the PC turns on its main power. The procedure then goes to step 330.

In the step 330, the data currently stored in the CMOS RAM are moved to a backup storage device that can retain data permanently, such as a hard disk. The procedure then goes to the step 340.

In the step 340, the PC turns off its main power. The procedure then goes to step 350.

In the step 350, which is executed at the next time the PC is powered on by the user, the data currently stored in the backup-data storage unit are moved back to the CMOS RAM, and then a message is displayed on the monitor screen requesting the user to replace the battery.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a computer system with a CMOS RAM unit powered by a battery unit to safeguard the CMOS RAM data when the battery power from the battery unit is below working level, comprising the steps of:

(1) in power-off state, detecting whether the current power level of the battery unit is below working level; if yes, performing the substeps of:
      (1-1) turning on the main power of the computer system;
      (1-2) moving the data currently stored in the CMOS RAM unit to a backup-data storage unit; and
      (1-3) turning off the main power of the computer system;
   (2) at the next time the computer system is powered on, moving the data currently stored in the backup-data storage unit back to the CMOS RAM unit; and
   (3) displaying a message requesting the user to replace the battery unit with a new one.

2. The method of claim 1, wherein the backup-data storage unit is a hard disk.

3. A CMOS RAM data safeguarding circuit for use on a computer system of the type having a power supply capable of generating a main power and a standby power and having a CMOS RAM unit powered by a battery unit when the computer system is powered off and by the main power from the power supply when the computer system is powered on, for safeguarding the data stored in the CMOS RAM unit when the power from the battery unit is below working level; the CMOS RAM data safeguarding circuit comprising:

a backup-data storage unit;
   a battery power detector, which is powered by the standby power from the power supply when the computer system is powered off, for detecting whether the battery power from the battery unit is below working level; if yes, the battery power detector generating a backup request signal; and
   a main control unit, which is powered by the main power from the power supply when the computer system is powered on and by the standby power from the same power supply when the computer system is powered off; capable of, when activated by the backup request signal from the battery power detector, moving the data currently stored in the CMOS RAM unit to the backup-data storage unit, and thereafter, at the next time the computer system is powered on, moving the backup data from the backup-data storage unit back to the CMOS RAM unit.

4. The circuit of claim 3, wherein the backup-data storage unit is a hard disk.

5. The circuit of claim 3, wherein the power supply is of the type capable of being switched on and off automatically through software means.

6. A CMOS RAM data safeguarding circuit for use on a computer system of the type having a power supply capable of generating a main power and a standby power and a CMOS RAM unit powered by a battery unit when the computer system is powered off and by the main power from the power supply when the computer system is powered on, for safeguarding the data stored in the CMOS RAM unit when the power from the battery unit is below working level; the CMOS RAM data safeguarding circuit comprising:

a battery power detector, which is powered by the standby power from the power supply when the computer system is powered off, for detecting whether the battery power from the battery unit is below working level; if yes, the battery power detector generating a backup request signal; and
   a main control unit, which is powered by the main power from the power supply when the computer system is powered on and by the standby power from the same power supply when the computer system is powered off, capable of, when activated by the backup request signal from the battery power detector, moving the data currently stored in the CMOS RAM unit to a permanent data storage unit of the computer system, and thereafter, at the next time the computer system is powered on, moving the backup data from the data storage unit back to the CMOS RAM unit.

7. The circuit of claim 6, wherein the data storage unit is a hard disk.

8. The circuit of claim 6, wherein the power supply is of the type capable of being switched on and off automatically through software means.

* * * * *